US011110690B2

(12) United States Patent
Hansen et al.

(10) Patent No.: US 11,110,690 B2
(45) Date of Patent: Sep. 7, 2021

(54) TIE LAYER COMPOSITIONS AND MULTILAYER FILMS INCORPORATING THE SAME

(71) Applicant: Dow Global Technologies LLC, Midland, MI (US)

(72) Inventors: Sydney E. Hansen, Freeport, TX (US); Brian W. Walther, Freeport, TX (US); Hayley A. Brown, Freeport, TX (US); Santosh S. Bawiskar, Freeport, TX (US)

(73) Assignee: Dow Global Technologies, Midland, MI (US)

( * ) Notice: Subject to any disclaimer, the term of this patent is extended or adjusted under 35 U.S.C. 154(b) by 19 days.

(21) Appl. No.: 16/461,534

(22) PCT Filed: Nov. 10, 2017

(86) PCT No.: PCT/US2017/061043
§ 371 (c)(1),
(2) Date: May 16, 2019

(87) PCT Pub. No.: WO2018/093673
PCT Pub. Date: May 24, 2018

(65) Prior Publication Data
US 2019/0351657 A1 Nov. 21, 2019

Related U.S. Application Data

(60) Provisional application No. 62/422,862, filed on Nov. 16, 2016.

(51) Int. Cl.
| | |
|---|---|
| *B32B 27/08* | (2006.01) |
| *B32B 7/12* | (2006.01) |
| *B32B 27/18* | (2006.01) |
| *B32B 27/30* | (2006.01) |
| *B32B 27/32* | (2006.01) |
| *C08F 255/02* | (2006.01) |
| *C08K 5/00* | (2006.01) |
| *C08K 5/134* | (2006.01) |
| *C08K 5/5333* | (2006.01) |
| *C08L 23/06* | (2006.01) |
| *C08L 23/08* | (2006.01) |
| *C08L 51/06* | (2006.01) |
| *C08L 53/02* | (2006.01) |

(52) U.S. Cl.
CPC ............ *B32B 27/08* (2013.01); *B32B 7/12* (2013.01); *B32B 27/18* (2013.01); *B32B 27/302* (2013.01); *B32B 27/32* (2013.01); *C08F 255/02* (2013.01); *C08K 5/005* (2013.01); *C08K 5/1345* (2013.01); *C08K 5/5333* (2013.01); *C08L 23/06* (2013.01); *C08L 23/0815* (2013.01); *C08L 51/06* (2013.01); *C08L 53/02* (2013.01); *B32B 2250/05* (2013.01); *B32B 2250/24* (2013.01); *B32B 2307/308* (2013.01); *B32B 2307/50* (2013.01); *B32B 2307/74* (2013.01); *C08K 2201/014* (2013.01)

(58) Field of Classification Search
CPC ........... B32B 27/08; B32B 27/32; B32B 7/12; B32B 27/18
USPC ....................................... 428/422, 34.1, 35.7
See application file for complete search history.

(56) References Cited

U.S. PATENT DOCUMENTS

| | | | |
|---|---|---|---|
| 3,645,992 | A | 2/1972 | Elston |
| 3,914,342 | A | 10/1975 | Mitchell |
| 4,076,698 | A | 2/1978 | Anderson et al. |
| 4,599,392 | A | 7/1986 | McKinney et al. |
| 4,762,890 | A | 8/1988 | Strait et al. |
| 4,927,888 | A | 5/1990 | Strait et al. |
| 4,939,196 | A | 7/1990 | Sasaki et al. |
| 4,950,541 | A | 8/1990 | Tabor et al. |
| 5,045,581 | A | 9/1991 | Takata et al. |
| 5,047,461 | A | 9/1991 | Takata et al. |
| 5,272,236 | A | 12/1993 | Lai et al. |
| 5,278,272 | A | 1/1994 | Lai et al. |
| 5,582,923 | A | 12/1996 | Kale et al. |
| 5,733,155 | A | 3/1998 | Sagawa |
| 5,854,045 | A | 12/1998 | Fang et al. |
| 6,031,034 | A | 2/2000 | Morimoto et al. |
| 7,732,518 | B2 | 6/2010 | Awa et al. |
| 2007/0155900 | A1 | 7/2007 | Chang et al. |
| 2007/0167569 | A1 | 7/2007 | Botros |
| 2009/0171022 | A1 | 7/2009 | Botros |
| 2010/0040875 | A1 | 2/2010 | Patel et al. |
| 2012/0077048 | A1 | 3/2012 | Botros |
| 2014/0322542 | A1 | 10/2014 | Botros |
| 2017/0203278 | A1* | 7/2017 | Hirose ................. B01J 20/0222 |

FOREIGN PATENT DOCUMENTS

CA     1291590 C    10/1991

OTHER PUBLICATIONS

Luegno et al., "Synergistic ProFiles of Chain-Breaking Antioxidants with Phosphites and Hindered Amine Light Stabilizers in Styrene-Ethylene-Butadiene-Styrene (SEBS) Block Copolymer", Journal of Vinyl & Additive Technology, 2006, 8-13.
International Search Report and Written Opinion pertaining to PCT/US2017/061043, dated Feb. 16, 2018.
International Preliminary Report on Patentability pertaining to PCT/US2017/061043, dated May 21, 2019.
Exam Report pertaining to corresponding Indian Patent Application No. 201917021064, dated Mar. 4, 2021.

* cited by examiner

*Primary Examiner* — Ellen S Hock
(74) *Attorney, Agent, or Firm* — Dinsmore & Shohl LLP

(57) ABSTRACT

Embodiments are directed to a tie layer composition comprising functionalized polyethylene, styrene block copolymer, base polyethylene, and antioxidant co-stabilizers, wherein the antioxidant co-stabilizers comprise at least one oxygen scavenger, at least one peroxy free radical scavenger, and at least one alkyl free radical scavenger. Further embodiments are directed to multilayer films or sheets which include the tie layer composition.

16 Claims, No Drawings

TIE LAYER COMPOSITIONS AND MULTILAYER FILMS INCORPORATING THE SAME

CROSS-REFERENCE TO RELATED APPLICATIONS

This application claims priority to U.S. Provisional Application Ser. No. 62/422,862 filed on Nov. 16, 2016, the entire disclosure of which is hereby incorporated by reference.

TECHNICAL FIELD

Embodiments of the present disclosure generally relate to tie layer compositions having improved thermal stability and adhesion strength, and structures incorporating the tie layer, for example, sheets and multilayer films incorporating the tie layer compositions.

BACKGROUND

In the food packaging industry, multilayer films are commonly used and often include multiple polymer layers, and tie layers therebetween. The primary function of a tie layer is to promote adhesion between polymer substrates. However, multilayer films, especially multilayer films with polystyrene outer layers, are susceptible to thermal degradation. Once thermal degradation occurs, adhesion to polystyrene substantially decreases and failure occurs. Accordingly, there is a continual need for improved tie layer compositions with improved thermal stability and adhesion.

SUMMARY

Accordingly, embodiments of the present disclosure are directed to tie layer compositions that provide greater thermal stability and thereby greater adhesion performance by using a unique combination of antioxidant co-stabilizers. With multilayer films including polystyrene outer layers, tie layers including styrene block copolymers are utilized for adhesion; however, styrene block copolymers may be subject to polymer damage. One of the primary causes of polymer damage in styrene block copolymers (e.g., styrene butadiene styrene (SBS)) is chain coupling, which causes a dramatic increase in molecular weight. Without being bound by theory, the increase in molecular weight alters the flow properties of the tie layer such that the styrene block copolymer does not flow to the polystyrene interface, thereby yielding a lower level of adhesion. Embodiments of the present tie layer compositions include anti-oxidant co-stabilizers which deactivate carbon centered radicals to minimize polymer damage to the styrene block copolymers with the net result of a higher level of polymer flow and resulting adhesion.

In one embodiment of this disclosure, the tie layer composition comprises functionalized polyethylene, styrene block copolymer, base polyethylene, and antioxidant co-stabilizers, wherein the antioxidant co-stabilizers comprise at least one oxygen scavenger, at least one peroxy free radical scavenger, and at least one alkyl free radical scavenger.

According to one embodiment of this disclosure, a multilayer film comprising at least five layers is provided, wherein the multilayer film comprises at least one polyolefin outer layer, at least one polystyrene outer layer, at least one core layer disposed between the polyolefin outer layer and the polystyrene outer layer, wherein the core layer comprises a polar polymer. The multilayer film also comprises a first tie layer disposed between the polyolefin outer layer and the core layer, and a second tie layer disposed between the polystyrene outer layer and the core layer, wherein the first tie layer, the second tie layer, or both comprises the aforementioned tie layer composition.

DETAILED DESCRIPTION

Specific embodiments of the present application will now be described. The disclosure may, however, be embodied in different forms and should not be construed as limited to the embodiments set forth in this disclosure. Rather, these embodiments are provided so that this disclosure will be thorough and complete, and will fully convey the scope of the subject matter to those skilled in the art.

The term "polymer" refers to a polymeric compound prepared by polymerizing monomers, whether of the same or a different type. The generic term polymer thus embraces the term "homopolymer," usually employed to refer to polymers prepared from only one type of monomer, and the term "copolymer" which refers to polymers prepared from at least two monomers and can encompass more than two monomers, for example, in the case of terpolymers.

The term "polyethylene" refers to a polymer that contains more than 50 weight percent polymerized ethylene monomer (based on the total amount of polymerizable monomers) and, optionally, may contain at least one comonomer. In embodiments herein, the polyethylene may be a polyethylene homopolymer, an ethylene/α-olefin copolymer, or a combination thereof. The term "ethylene/α-olefin copolymer" refers to a polymer that contains more than 50 weight percent polymerized ethylene monomer (based on the total amount of polymerizable monomers) and at least one other α-olefin comonomer. Common forms of polyethylene known in the art include Low Density Polyethylene (LDPE); Linear Low Density Polyethylene (LLDPE); Ultra Low Density Polyethylene (ULDPE); Very Low Density Polyethylene (VLDPE); single site catalyzed Linear Low Density Polyethylene, including both linear and substantially linear low density resins (m-LLDPE); and High Density Polyethylene (HDPE). These polyethylene materials are generally known in the art; however, the following descriptions may be helpful in understanding the differences between some of these different polyethylene resins.

The term "LDPE" may also be referred to as "high pressure ethylene polymer" or "highly branched polyethylene" and is defined to mean that the polymer is partly or entirely homopolymerized or copolymerized in autoclave or tubular reactors at pressures above 14,500 psi (100 MPa) with the use of free-radical initiators, such as peroxides (See for example U.S. Pat. No. 4,599,392, incorporated herein by reference). LDPE resins typically have a density in the range of 0.916 to 0.940 g/cm$^3$.

The term "LLDPE", includes both resins made using the traditional Ziegler-Natta catalyst systems as well as single-site catalysts such as metallocenes (sometimes referred to as "m-LLDPE"). LLDPEs contain less long chain branching than LDPEs and include the substantially linear ethylene polymers which are further defined in U.S. Pat. Nos. 5,272,236, 5,278,272, 5,582,923 and 5,733,155; the homogeneously branched linear ethylene polymer compositions such as those in U.S. Pat. No. 3,645,992; the heterogeneously branched ethylene polymers such as those prepared according to the process disclosed in U.S. Pat. No. 4,076,698; and/or blends thereof (such as those disclosed in U.S. Pat. No. 3,914,342 or 5,854,045). The LLDPE can be made via gas-phase, solution-phase or slurry polymerization or any combination thereof, using any type of reactor or reactor configuration known in the art, including but not limited to gas and solution phase reactors.

The term "HDPE" refers to polyethylenes having densities greater than about 0.940 g/cm$^3$, which are generally prepared with Ziegler-Natta catalysts, chrome catalysts or even metallocene catalysts.

The term "polypropylene" refers to a polymer that contains more than 50 weight percent polymerized propylene monomer (based on the total amount of polymerizable monomers) and, optionally, may contain at least one comonomer. Suitable polypropylenes may include propylene homopolymers, copolymers of propylene and at least one comonomer, and blends thereof. In embodiments herein, the polypropylene may be a propylene homopolymer, a propylene copolymer, or a combination thereof. The polypropylene homopolymer may be isotactic, atactic, or syndiotactic. In some embodiments, the polypropylene is an isotactic polypropylene homopolymer. In other embodiments, the polypropylene is a propylene/α-olefin copolymer. The propylene/α-olefin copolymer may be random or block, or an impact polypropylene copolymer. Impact polypropylene copolymers may also include heterophasic polypropylene copolymers, where polypropylene is the continuous phase and an elastomeric phase is uniformly dispersed therein. In various embodiments, the polypropylene comprises greater than 50 wt. % of the units derived from propylene and less than 50 wt. % of the units derived from one or more $C_2$ or $C_{4-20}$ alpha-olefin comonomers.

The term "blend" means an intimate physical mixture (that is, without reaction) of two or more polymers. A blend may or may not be miscible (not phase separated at molecular level). A blend may or may not be phase separated. A blend may or may not contain one or more domain configurations, as determined from transmission electron spectroscopy, light scattering, x-ray scattering, and other methods known in the art. The blend may be effected by physically mixing the two or more polymers on the macro level (for example, melt blending resins or compounding) or the micro level (for example, simultaneous forming within the same reactor).

Embodiments of the present disclosure are directed to tie layer compositions comprising functionalized polyethylene, styrene block copolymer, base polyethylene, and antioxidant co-stabilizers, wherein the antioxidant co-stabilizers comprise at least one oxygen scavenger, at least one peroxy free radical scavenger, and at least one alkyl free radical scavenger. Further embodiments are directed to a multilayer film or sheet comprising at least one polyolefin outer layer, at least one polystyrene outer layer, at least one core layer disposed between the polyolefin outer layer and the polystyrene outer layer, the core layer comprising ethylene vinyl alcohol, a first tie layer disposed between the polyolefin outer layer and the core layer, and a second tie layer disposed between the polystyrene outer layer and the core layer, wherein the first tie layer, the second tie layer, or both comprises the above tie layer composition.

As used herein "outer layer" may mean the outermost layer or skin layer of the multilayer film; however, other embodiments of the multilayer film may include layers external to the outer layer.

Tie Layer(s)

As stated above, the present tie layer compositions comprise functionalized polyethylene, styrene block copolymer, base polyethylene, and antioxidant co-stabilizers comprising at least one oxygen scavenger, at least one peroxy free radical scavenger, and at least one alkyl free radical scavenger. Without being bound by theory, these tie layer compositions surprisingly provide improved adhesion, controlled viscosity, and compatibility with the core and outer layers of the multilayer film.

Base Polyethylene

Various embodiments are contemplated for the base polyethylene polymer in the tie layer. As used herein, the "base polyethylene" means that the polyethylene polymer only includes ethylene and other α-olefin comonomers. The base polyethylene may include various homopolymers, ethylene/α-olefin copolymers, or combinations thereof. In one or more embodiments, the base polyethylene is an ethylene/α-olefin copolymer, wherein the α-olefin comonomer typically has no more than 20 carbon atoms. For example, the α-olefin comonomers may have 3 to 12 carbon atoms, or from 4 to 8 carbon atoms. Exemplary α-olefin comonomers include, but are not limited to, propylene, 1-butene, 1-pentene, 1-hexene, 1-heptene, 1-octene, 1-nonene, 1-decene, and 4-methyl-1-pentene. In further embodiments, the one or more α-olefin comonomers may be selected from 1-butene, 1-hexene, or 1-octene.

The base polyethylene may have a density of from 0.890 g/cm$^3$ to 0.970 g/cm$^3$, or from 0.895 g/cm$^3$ to 0.935 g/cm$^3$, or from 0.905 g/cm$^3$ to 0.925 g/cm$^3$. The base polyethylene may also have a melt index, 12, of 0.5 to 10 g/10 min, or from 0.9 to 5 g/10 min when measured according to ASTM D 1238 at a load of 2.16 kg and temperature of 190° C.

Various polyethylenes are considered suitable for the base polyethylene. The base polyethylene may comprise ethylene/α-olefin copolymers, such as those selected from LLDPE, LDPE, VLDPE, HDPE, or combinations thereof. In further embodiments, the base polyethylene comprises LLDPE, LDPE, or combinations thereof.

Various commercial polyethylene products are considered suitable. For example, suitable commercial resins may include ELITE™ polyethylene resins such as ELITE™ 5400G or ELITE™ 5230G from The Dow Chemical Company, Midland, Mich. Suitable LLDPE resins may include DOWLEX™ 2045G or DOW™ LLDPE DFDA-7059 NT 7, which are also both supplied by The Dow Chemical Company, Midland, Mich. Suitable commercial LDPE resins may include DOW™ LDPE 5004i, which is also supplied by The Dow Chemical Company, Midland, Mich.

Various methodologies are contemplated for producing the base polyethylene, for example, polymerization of ethylene and one or more α-olefin comonomers in the presence of one or more catalysts, such as a Ziegler-Natta catalyst, a Phillips catalyst, a metallocene catalyst, a post-metallocene catalyst, a constrained geometry complex (CGC) catalyst, biphenyl phenol (BPP) complex catalyst, or combinations of these.

Various amounts of base polyethylene within the tie layer composition are contemplated. In one or more embodiments, the tie layer composition comprises 25 wt. % to 75 wt. % of base polyethylene, or 40 wt. % to 60 wt. % of base polyethylene.

While many embodiments may include only a single polyethylene used as the base polyethylene, it is contemplated that the base polyethylene comprises polyethylene blended with other polyolefins and additives. In these embodiments, the blend of polyethylene and polyolefins may have a density from 0.890 g/cm$^3$ to 0.970 g/cm$^3$ and a melt index (12) of 0.5 to 5 g/10 min when measured according to ASTM D 1238 at a load of 2.16 kg and temperature of 190° C.

Functionalized Polyethylene

Additionally, various embodiments are contemplated for the functionalized polyethylene in the tie layer. The functionalized polyethylene may include a functionalized polyethylene homopolymer, or a functionalized polyethylene copolymer, such as a functionalized ethylene/α-olefin copolymer. As used herein, "functionalized" means that there are reactive moieties grafted onto the polyethylene polymer backbone. The functionalizing of the polyethylene aids the chemical interaction of the functionalized polyethylene to polar polymers like nylon, ethylene vinyl alcohol (EVOH), and inorganic fillers. The grafted functionality also increases the surface polarity of the functionalized polyethylene.

The functionalized polyethylene may include a polyethylene having a density of from 0.890 $g/cm^3$ to 0.970 $g/cm^3$. In further embodiments, the density may be from 0.910 $g/cm^3$ to 0.960 $g/cm^3$, or from 0.910 $g/cm^3$ to 0.940 $g/cm^3$. The functionalized polyethylene may also have a melt index, $I_2$, of 0.5 to 10 g/10 min, or from 1 to 5.0 g/10 min when measured according to ASTM D 1238 at a load of 2.16 kg and temperature of 190° C.

Various polyethylenes are considered suitable for the functionalized polyethylene. The functionalized polyethylene may include ethylene/α-olefin copolymers, wherein the α-olefin comonomer includes $C_4$-$C_{20}$ olefins. For example, the functionalized polyethylene may include LLDPE, LDPE, VLDPE, HDPE, or combinations thereof. In a further embodiment, the functionalized polyethylene comprises LLDPE.

The ethylene/α-olefin copolymers are functionalized by incorporating at least one functional reactive group in its polymer structure. Exemplary functional groups include unsaturated carboxylic acids, esters of the unsaturated carboxylic acids, acid anhydrides, di-esters, salts, amides, imides, aromatic vinyl compounds, hydrolysable unsaturated silane compounds and unsaturated halogenated hydrocarbons. Such functional groups may be grafted to an ethylene/α-olefin copolymer. Means for grafting functional groups onto polyethylene are described for example in U.S. Pat. Nos. 4,762,890, 4,927,888, and 4,950,541, the disclosures of these patents are incorporated herein by reference in their entirety.

Examples of unsaturated carboxylic acids and acid derivatives include, but are not limited to, maleic anhydride, citraconic anhydride, 2-methyl maleic anhydride, 2-chloromaleic anhydride, 2,3-dimethylmaleic anhydride, bicyclo[2,2,1]-5-heptene-2,3-dicarboxylic anhydride and 4-methyl-4-cyclohexene-1,2-dicarboxylic anhydride, acrylic acid, methacrylic acid, maleic acid, fumaric acid, itaconic acid, citraconic acid, mesaconic acid, crotonic acid, bicyclo(2.2.2) oct-5-ene-2,3-dicarboxylic acid anhydride, lo-octahydronaphthalene-2,3-dicarboxylic acid anhydride, 2-oxa-1,3-diketospiro(4.4)non-7-ene, bicyclo(2.2.1)hept-5-ene-2,3-dicarboxylic acid anhydride, maleopimaric acid, tetrahydrophtalic anhydride, norbom-5-ene-2,3-dicarboxylic acid anhydride, nadic anhydride, methyl nadic anhydride, himic anhydride, methyl himic anhydride, and x-methyl-bi-cyclo(2.2.1)hept-5-ene-2,3-dicarboxylic acid anhydride. In one embodiment, the functional group is comprises maleic anhydride.

In terms of grafting level, the functional group (e.g., maleic anhydride) may be grafted at a level of 0.1 to 20 wt. % based on the total weight of the functionalized polyethylene. In further embodiments, the grafting level is from 0.2 to 10 wt. %, or from 0.5 to 5 wt. %, or from 1 to 3 wt. %. In further embodiments, the functionalized polyethylene may comprise greater than or equal to 2.0 wt %, or further greater than, or equal to, 2.1 wt %, or further greater than, or equal to 2.2 wt %, or further greater than or equal to 2.5 wt %, or further greater than or equal to 2.8 wt %, or further greater than or equal to 3.0 wt % of the functional group.

Various commercial products are considered suitable for the functionalized polyethylene. These may include maleic anhydride grafted polymers such as AMPLIFY™ TY 1057H by The Dow Chemical Company, Midland, Mich. and the BYNEL® 41E710 resin supplied by DuPont.

Various amounts of functionalized polyethylene within the tie layer composition are contemplated. In one or more embodiments, the tie layer composition comprises 5 wt. % to 40 wt. % of functionalized polyethylene, or 10 wt. % to 30 wt. % functionalized polyethylene.

Styrene Block Copolymer

Various embodiments are contemplated for the styrene block copolymer in the tie layer. In some embodiments, the styrene block copolymer may include two polystyrene blocks, separated by a block of saturated conjugated diene comprising less than 20% residual ethylenic unsaturation. In specific embodiments, the styrenic block copolymers may have a linear structure, although in some embodiments, the styrene block copolymer may also encompass branched or radial polymers or functionalized block copolymers.

In one or more embodiments, the styrene block copolymer may comprise styrene-butadiene-styrene (SBS), styrene-isoprene-styrene (SIS), styrene-ethylene-butadiene-styrene (SEBS), styrene-ethylene-propylene-styrene (SEPS), or combinations thereof. In a specific embodiment, the styrene block copolymer comprises high styrene block polymer. As used herein, "high styrene block polymer" means a styrene block copolymer having at least 35 wt. % of styrene in the styrene block copolymer. In some embodiments, the high styrene block polymer may comprise from 35 wt. % to 50 wt % styrene. In specific embodiments, the high styrene block polymer is a high styrene SBS, which comprises block segments of styrene monomer units and butadiene monomer units covalently bonded using anionic polymerization. One common structure is the linear A-B-A block type (styrene-butadiene-styrene).

Various commercial products are considered suitable for the styrene block copolymer. One example is Calprene® 540, a styrene-butadiene-styrene block copolymer that is supplied by Dynasol, and includes 60/40 wt % ratio of Butadiene/Styrene. Additionally, VECTOR® 6241 is another suitable commercial styrene-butadiene-styrene block copolymer supplied by Dexco Polymers.

Various amounts of styrene block copolymer within the tie layer composition are contemplated. In one or more embodiments, the tie layer composition comprises 20 wt. % to 50 wt. % styrene block copolymer, or 30 wt % to 40 wt % styrene block copolymer.

Antioxidant Co-Stabilizers

As stated previously, the tie layer composition may include antioxidant co-stabilizers comprising at least one oxygen scavenger, at least one peroxy free radical scavenger, and at least one alkyl free radical scavenger.

Peroxy free radical scavengers and oxygen scavengers are helpful in promoting adhesion in part due in part to their solubility in a polyolefin environment. However, these peroxy free radical scavengers and oxygen scavengers are less effective in styrenic environments, and potentially may not prevent degradation as needed thus resulting in diminished adhesion performance in styrenic environments, especially at higher temperatures. Alkyl free radicals may be more soluble in styrenic environments, but may not be as soluble in polyolefin environments, thus there is an expected tradeoff in terms of stabilization and thus adhesion. However, this synergistic combination of oxygen scavenger, peroxy free radical scavenger, and alkyl free radical scavenger, which is suitable in both styrenic and polyolefin environments, surprisingly provides improved adhesion and viscosity control which makes it highly effective in a tie layer composition in multilayer film compositions and sheets.

Various commercial products are considered for the for the antioxidant co-stabilizers. For example, the peroxy free radical scavengers may include sterically hindered phenolics, such as, IRGANOX® 1010 (pentaerythritol tetrakis(3-(3,5-di-tert-butyl-4-hydroxyphenyl)propionate) or IRGANOX® 1076 (octadecyl ester of 3,5 bis(1,1-dimethylethyl)-4-hydroxy benzene propanoic acid) supplied by Ciba Geigy. Oxygen scavengers may include phosphites, such as IRGAFOS® 168 (tris(2,4-ditertbutylphenyl)phosphite), also supplied by Ciba Geigy. The alkyl free radical scavengers may include acrylates such as SUMILIZER® GM (2-tert-butyl-6(3-tert-butyl -2-hydroxy-5-methylbenzyl)-4-methylphenyl acrylate) or SUMILIZER® GS (2-tert-Butyl -6-(3-tert-butyl-2-hydroxy-5-methylbenzyl)-4-methylphenyl acrylate, both of which are supplied by Sumitomo Chemical.

While the present embodiments of the antioxidant co-stabilizers minimally include at least one oxygen scavenger, at least one peroxy free radical scavenger, and at least one alkyl free radical scavenger, it is contemplated that the tie layer composition may comprise a plurality of oxygen scavengers, a plurality of peroxy free radical scavengers, a plurality of alkyl free radical scavengers, or combinations thereof. In one example, the tie layer composition may comprise one oxygen scavenger, two peroxy free radical scavengers, and one alkyl free radical scavenger.

Various amounts are contemplated for the antioxidant co-stabilizers in the tie layer composition. In one or more embodiments, the tie layer composition comprises from 3000 to 10,000 ppm of the antioxidant co-stabilizers, or from 3000 to 8000 ppm of the antioxidant co-stabilizers, or from 3000 to 7000 ppm of the antioxidant co-stabilizers, or from or from 5000 to 7000 ppm of the antioxidant co-stabilizers. Moreover, on an individual basis, the tie layer composition comprises 1000 to 4300 ppm of the alkyl free radical scavenger, or from 1000 to 3200 ppm of the alkyl free radical scavenger.

Polyolefin Outer Layer(s)

As stated above, embodiments of the present multilayer films may include one or more polyolefin outer layers. In one or more embodiments, the polyolefin outer layers may comprise various polyolefins, for example, polypropylene, polyethylene, or combinations thereof.

In further embodiments, the polyolefin outer layer may include one or more polyethylene homopolymers, ethylene/α-olefin copolymers, or combinations thereof. The polyolefin outer layer may have a density of from 0.890 g/cm$^3$ to 0.970 g/cm$^3$, or from 0.910 g/cm$^3$ to 0.970 g/cm$^3$, or from 0.920 g/cm$^3$ to 0.960 g/cm$^3$. In embodiments wherein the polyolefin outer layer comprises polyethylene, the polyolefin outer layer may have a melt index, $I_2$, of 0.5 to 10 g/10 min, or from 1.0 to 10 g/10 min, or from 3.0 to 10 g/10, or from 5 to 10 g/10 min when measured according to ASTM D 1238 at a load of 2.16 kg and temperature of 190° C.

Various polyethylenes are considered suitable for the polyolefin outer layer. These polyethylene polymers may be the same or different as the polyethylene polymers in the tie layer composition. The polyethylenes in the polyolefin outer layer may comprise ethylene/α-olefin copolymers, such as those selected from LLDPE, LDPE, VLDPE, HDPE, or combinations thereof. In further embodiments, the polyolefin outer layers comprise LLDPE, LDPE, or combinations thereof. Various polypropylenes are also considered suitable for the polyolefin outer layer, for example, polypropylene homopolymers, polypropylene random copolymers, reinforced polypropylene, or combinations thereof.

While many embodiments may include only a single polyethylene used in the one or more polyolefin outer layers, it is contemplated that the polyolefin outer layer comprises polyethylene mixed with other polyolefins. In one or more embodiments, the polyolefin outer layer may include at least two polyethylene resins. For example, the polyolefin outer layer may include HDPE and LDPE to achieve a combination of improved barrier properties and processability. In this HDPE/LDPE embodiment, the polyolefin outer layer may include 10 to 95 wt. % HDPE, or from 30 to 90 wt. % HDPE, or from 30 to 90 wt. wt. % HDPE. Conversely, the polyolefin outer layer may include 5 to 90 wt. % LDPE, or from 10 to 50 wt. % LDPE, or from 10 to 30 wt. % LDPE.

Various commercial polyethylene products are contemplated for the polyolefin outer layer. For example, suitable commercial resins may include ELITE™ polyethylene resins such as ELITE™ 5400G or ELITE™ 5230G from The Dow Chemical Company, Midland, Mich. Suitable LLDPE resins may include DOWLEX™ 2045G or DOW™ LLDPE DFDA-7059 NT 7, which are also both supplied by The Dow Chemical Company, Midland, Mich. Suitable commercial LDPE resins may include DOW™ LDPE 5004i or DOW™ LDPE 722, which are both supplied by The Dow Chemical Company, Midland, Mich. Suitable commercial HDPE resins may include DOW™ HDPE DMDA-8007 NT 7, which are both supplied by The Dow Chemical Company, Midland, Mich.

Various commercial polypropylene products are also contemplated for the polyolefin outer layer. For example, suitable commercial resins may include the Braskem PP 6D83K polypropylene random copolymer from Braskem. Other propylene-ethylene copolymer resins may include VERSIFY™ 3000 or 3200, which are both supplied by The Dow Chemical Company, Midland, Mich.

Polystyrene Outer Layer

Further as stated above, embodiments of the present multilayer films may also include one or more polystyrene outer layers. Various compositions are considered suitable for the polystyrene outer layer. For example and not by way of limitation, the polystyrene outer layer may include polystyrene (PS), styrene block copolymers, high impact polystyrene (HIPS), blends of multiple styrene polymers, and blends of styrene polymers and polyolefins. The blends of styrene polymers and polyolefins may include greater than 50 wt. % styrene polymer.

As used herein, PS which may also be referred to as General Purpose Polystyrene (GPPS), is an atactic polystyrene homopolymer produced by free radical polymerization of styrene monomer. As used herein, HIPS is produced by dissolving polybutadiene rubber in styrene monomer and then polymerizing the styrene monomer. The result is a polystyrene matrix with grafted chains of polystyrene onto the polybutadiene. The morphology of HIPS is polybutadiene particles dispersed in a styrene matrix with the polybutadiene particles (~1-6 microns) having some styrene inclusions.

One suitable commercial product for the polystyrene outer layer is STYRON® 484 high impact polystyrene resin supplied by American Styrenics.

In further embodiments, regrind or scrap material is often blended with polystyrene. Resin processors usually mix the regrind with virgin resin or use it by itself. In addition, with the efforts to recycle post-consumer plastic waste, these same resins that contain regrind product may be recycled and exposed to additional processing. In one or more embodiments, the polystyrene outer layers may include pure virgin polystyrene resin, or may include from 0 to 30 wt % regrind, or from 5 to 25 wt. % regrind.

Core Layer(s)

In one or more embodiments, the one or more core layers may include polar polymers selected from polyamide, ethylene vinyl alcohol copolymer (EVOH), polyester or combinations thereof. In another embodiment, the polar polymer comprises EVOH.

Various embodiments are contemplated for the EVOH. Commercial embodiments of the ethylene vinyl alcohol may include EVAL™ H171B supplied by EVAL Europe and Kuraray. Other EVOH polymers may include EVAL™ E171B or EVAL™ L171B also supplied by EVAL Europe and Kuraray.

Alternatively, the polar polymer may be a polyamide such as Nylon 6, Nylon 6,6, or combinations thereof. In another embodiment, the polyamide comprises polymeric units derived from hexamethylene diamine, adipic acid, and caprolactam.

Optionally, the core layer, the polyolefin outer layer and/or the polystyrene outer layer may independently comprise one or more additives such as pigments, colorants, fillers (e.g., calcium carbonate, mica, talc, kaolin, perlite, diatomaceous earth, dolomite, magnesium carbonate, calcium sulfate, barium sulfate, glass beads, polymeric beads, ceramic beads, natural and synthetic silica, aluminum trihydroxide, magnesium trihydroxide, wollastonite, whiskers, wood flour, lignin, starch), $TiO_2$, anti-stat additives, flame retardants, slip agents, antiblock additives, biocides, antimicrobial agents, and clarifiers/nucleators (e.g., HYPERFORM™ HPN -20E, MILLAD™ 3988, MILLAD™ NX 8000, available from Milliken Chemical).

Multilayer Film

The multilayer film may include thicknesses ranging from 500 to 2000 μm, or from 500 to 1500 μm. In one or more embodiments, the tie layers may have a combined thickness of 2 to 20% of the overall thickness of the multilayer film, or from 3 to 15% of the overall thickness of the multilayer film.

The thickness of a film layer can be determined, as known in the art, from the mass ratios of each layer composition of the extruders used to form a multilayered film, and the final thickness of the multilayered film. For each film layer, the solid state density of each composition is determined, and the mass flow of the associated extruder is known from the commonly used gravimetric feeders. From these two parameters, the volumetric flow of each layer composition can be determined. The volume ratio of each layer can be determined from the volume flow of the individual layer divided by the total volume flows of all layer compositions. For a constant total film thickness and width, the thickness ratio for each layer is the same as the volume ratio.

Examples

The following multilayer film examples illustrate features of the present disclosure but are not intended to limit the scope of the disclosure.

Multilayer Film Components

ELITE™ 5230G is an ethylene/α-olefin copolymer having a melt index ($I_2$) of 4.0 g/10 min when measured according to ASTM D 1238 at a load of 2.16 kg and temperature of 190° C., and a density of 0.916 g/cm³.

ELITE™ 5230G is commercially available from The Dow Chemical Company (Midland, Mich.).

DOW DFDA-7059 NT 7 is an LLDPE resin having a melt index ($I_2$) of 2.0 g/10 min when measured according to ASTM D 1238 at a load of 2.16 kg and temperature of 190° C., and a density of 0.918 g/cm³. DOW DFDA-7059 NT 7 is commercially available from The Dow Chemical Company (Midland, Mich.).

DOW™ HDPE DMDA-8007 NT 7, which is commercially available from The Dow Chemical Company (Midland, Mich.), is an HDPE resin having a melt index ($I_2$) of 8.2 g/10 min when measured according to ASTM D 1238 at a load of 2.16 kg and temperature of 190° C., and a density of 0.965 g/cm³.

DOW™ LDPE 722, which is commercially available from The Dow Chemical Company (Midland, Mich.), is an LDPE resin having a melt index ($I_2$) of 8.0 g/10 min when measured according to ASTM D 1238 at a load of 2.16 kg and temperature of 190° C., and a density of 0.918 g/cm³.

STYRON® 484, which is supplied by American Styrenics, is a high impact polystyrene resin having a density of 1.04 g/cm³.

EVAL™ H171B, which is supplied by EVAL Europe and Kuraray, is an ethylene vinyl alcohol copolymer having a melt index ($I_2$) of 8.0 g/10 min when measured according to ISO 1133 at a load of 2.16 kg and temperature of 190° C., and a density of 1.17 g/cm³.

Calprene® 540, which is supplied by Dynasol, is a styrene-butadiene-styrene block copolymer including 60/40 wt % ratio of butadiene/styrene Additionally, VECTOR® 6241 is another commercial styrene-butadiene-styrene block copolymer supplied by Dexco Polymers.

VECTOR® 6241, which is supplied by Dexco Polymers, is a styrene-butadiene-styrene block copolymer having 43 wt. % styrene.

Maleic anhydride (MAH) graft concentrate #1 is the maleic anhydride grafted linear low density polyethylene (LLDPE) listed as Inventive Example 1 in U.S. provisional application 62/272,390 filed on Dec. 29, 2015, which is incorporated by reference herein in its entirety. The LLDPE of the MAH graft concentrate #1 is a single site-catalyzed LLDPE described in PCT Publication WO 2007/136496, which is also incorporated by reference herein in its entirety. Moreover, the MAH graft concentrate #1, has a melt index ($I_2$) of 2.3 g/10 min when measured according to ASTM 1238 D at a load of 2.16 kg and temperature of 190° C., and a density of 0.920 g/cm³. The MAH graft level of the MAH graft concentrate #1 is 2.45 wt %, and the grafting process is described in U.S. provisional application 62/272,390.

Maleic anhydride (MAH) graft concentrate #2 is maleic anhydride grafted HDPE. The MAH graft concentrate #2 has a melt index ($I_2$) of 6.0 g/10 min when measured according to ASTM 1238 D at a load of 2.16 kg and temperature of 190° C., and a density of 0.960 g/cm³. The MAH graft level of the MAH graft concentrate #2 is 2.28 wt %.

Method of Making the Tie Layer Composition

The tie layer compositions, which include the components listed in Table 2 below and the antioxidants listed in Table 3, were compounded on a Coperion ZSK-26 mm, co-rotating twin screw extruder. This machine was configured with 11 barrels having a length/diameter (L/D) ratio of 44. A low intensity mixing screw was used to limit the melt temperature below 200° C. The machine was equipped with K-Tron loss-in weight feeders for feeding powders and pellets. Specifically, the base polyethylene, the MAH grafted polyethylene, and the styrene block copolymer compositions of Table 2 were fed as pellets and the antioxidants were coated on a portion of the base polyethylene and fed to the extruder. A Gala LPU™ underwater pelletizer was used to pelletize the material. Nitrogen gas was injected in the hopper to maintain an inert atmosphere and minimize oxidation at 5-10 Standard Cubic Feet per Hour (SCFH). The run rate was kept constant at 25 lbs/hr and the screw speed was 300 rpm. All tie layer compositions were produced in 40 to 50 minutes. The temperature profile within the extruder is shown in Table 1 below.

TABLE 1

| Zone 2 (° C.) | Zone 3 (° C.) | Zone 4 (° C.) | Zone 5 (° C.) | Zone 6 (° C.) | Zone 7 (° C.) | Zone 8 (° C.) | Zone 9 (° C.) | Zone 10 (° C.) | Zone 11 (° C.) | Adaptor (° C.) | Die (° C.) |
|---|---|---|---|---|---|---|---|---|---|---|---|
| 130 | 190 | 190 | 190 | 140 | 140 | 110 | 110 | 110 | 160 | 165 | 160 |

TABLE 2

Tie Layer Compositions- Resins and Bulk Properties

| | Base Polyethylene (wt %) | Styrene Block Copolymer (wt %) | Functionalized Polyethylene (wt %) | Overall Melt Index ($I_2$) (g/10 min) | Overall Density (g/cm$^3$) |
|---|---|---|---|---|---|
| Tie Layer Sample | 49.4 wt % ELITE 5230 | 35 wt. % Calprene 540 | 15 wt. % MAH graft concentrate #1 | 3 | 0.930 |
| Comparative Tie Layer Sample 1 | 49.6 wt % ELITE 5230 | 35 wt. % Calprene 540 | 15 wt. % MAH graft concentrate #1 | 3 | 0.930 |
| Comparative Tie Layer Sample 2 | 49.6 wt % DOW DFDA-7059 NT 7 | 35 wt. % Vector 6241 | 15 wt. % MAH graft concentrate #2 | 5 | 0.935 |

TABLE 3

Tie Layer Compositions - Antioxidant Co-stabilizers and Viscosity

| | Peroxy Free Radical Scavengers (ppm) | Oxygen Scavengers (ppm) | Alkyl Free Radical Scavengers (ppm) | Viscosity at 1000 seconds (Pa · s) | Viscosity at 2000 seconds (Pa · s) | Viscosity at 3000 seconds (Pa · s) |
|---|---|---|---|---|---|---|
| Tie Layer Sample | 1000 ppm IRGANOX 1010 + 1000 ppm IRGANOX 1076 | 2000 ppm IRGAFOS 168 | 2000 ppm SUMILIZER GM | 9500 | 20000 | 33000 |
| Comparative Tie Layer Sample 1 | 1000 ppm IRGANOX 1010 + 1000 ppm IRGANOX 1076 | 2000 ppm IRGAFOS 168 | 0 | 10000 | 29000 | 42000 |
| Comparative Tie Layer Sample 2 | 1000 ppm IRGANOX 1010 + 1000 ppm IRGANOX 1076 | 2000 ppm IRGAFOS 168 | 0 | 8700 | 22000 | 33000 |

Using the viscosity testing procedure described below, plaques of the tie layer composition were tested at various time intervals. As shows in Table 3 above, Tie Layer Sample 1 and Comparative Tie Layer Sample 1 have the same composition with the exception of the SUMILIZER GM alkyl free radical scavenger incorporated in Tie Layer Sample 1. However, Comparative Tie Layer Sample 1 shows a much greater increase in viscosity at 2000 second and 3000 seconds as compared to Tie Layer Sample 1. This demonstrates that the inclusion of SUMILIZER GM alkyl free radical scavenger provides much great viscosity control. While Comparative Example 2 utilizes different tie layer components with a higher melt index to achieve a similar viscosity control, the adhesion data is vastly inferior to Tie Layer Sample 1. Only Tie Layer Sample 1 surprisingly achieves the synergistic combination of improved viscosity control and improved adhesion strength.

Referring to Table 5 below, multilayer film compositions were produced using the following compositions to evaluate the adhesion properties. Specifically, a multilayer film having an E/B/C/D/C/A structure with a respective layer thickness ratio of 35/44/4/4/4/13 was produced. In this case, E and B represent the polystyrene outer layer, C represents the tie layers, D represents the core layer, and A represents the polyolefin outer layer.

Films were fabricated on the 5 extruder Davis-Standard Cast extrusion line with Cloeren Nanolayer™ feedblock and die. The extrusion line includes a gravimetric feed system and on line edge trimming components. The typical line speed is from 250 to 100 lbs/h for a 1-70 mil die gap when running 5 to 37 layers. Additional specifications of this line are provided as follows:

TABLE 4

Extrusion Line Specifications

| Extrusion Line Parameter | Value |
|---|---|
| Extruder A Diameter | 1.5 in |
| Extruder B Diameter | 2.0 in |
| Extruder C Diameter | 1.5 in |
| Extruder D Diameter | 1.25 in |
| Extruder E Diameter | 1.5 in |
| Die width | 30 in |
| Die gap | 45 mils |

TABLE 5

Multilayer Film Compositions

| | Film Example | Comparative Film Example 1 | Comparative Film Example 2 |
|---|---|---|---|
| Polyolefin outer layer | 80 wt. % DOW ™ HDPE DMDA-8007 NT 7 + 20 wt. % DOW ™ LDPE 722 | 80 wt. % DOW ™ HDPE DMDA-8007 NT 7 + 20 wt. % DOW ™ LDPE 722 | 80 wt. % DOW ™ HDPE DMDA-8007 NT 7 + 20 wt. % DOW ™ LDPE 722 |
| Tie Layers | Tie Layer Sample | Comparative Tie Layer Sample 1 | Comparative Tie Layer Sample 2 |
| Core Layer | 100 wt. % EVAL H171 | 100 wt. % EVAL H171 | 100 wt. % EVAL H171 |
| Polystyrene Outer Layer | 100 wt. % STYRON ® 484 | 100 wt. % STYRON ® 484 | 100 wt. % STYRON ® 484 |
| Total Tie Layer Thickness | 3.7 mils* | 3.7 mils* | 3.7 mils* |
| Overall Multilayer Film Thickness | 48 mils (~1220 µm) | 48 mils (~1220 µm) | 48 mils (~1220 µm) |

*The total tie layer thickness is 3.7 mils (~94.0 µm) with each tie layer being 1.85 mils (~47 µm).

TABLE 5

Film Data

| | Peak Load (lbf) |
|---|---|
| Film Example | 8.8 |
| Comparative Film Example 1 | 4.19 |
| Comparative Film Example 2 | 3.2 |

As shown in Table 5 above, the Film Example demonstrates a significant improvement in peak load as compared to Comparative Film Examples 1 and 2. Specifically, the Film Example requires a load of 8.8 lbf before delamination of the polystyrene outer layer from the multilayer film begins to occur. In contrast, in Comparative Film Examples 1 and 2, delamination of the polystyrene outer layer from the multilayer film occurs at much lesser loads. Thus, the Film Examples shows much greater adhesion. As stated above, Comparative Film Example 2 includes Comparative Tie Layer Sample 2, which showed a similar viscosity profile as Tie Layer Example 1; however, when incorporated into a multilayer film, Comparative Tie Layer Sample 2 demonstrates the lowest peak load and thus the worst adhesion performance of the multilayer films.

Test Methods

The test methods include the following:

Melt Index

Melt indices (12) were measured in accordance to ASTM D-1238 at 190° C. and at 2.16 kg. Their values are reported in g/10 min, which corresponds to grams eluted per 10 minutes.

Density

Samples for density measurement were prepared according to ASTM D4703. Measurements were made within one hour of sample pressing using ASTM D792, Method B.

Viscosity—Time Sweep Test Under Air Atmosphere

Dynamic-oscillatory time sweep test was used to evaluate the thermal oxidative stability of the resins. This test was performed by using compression molded plaques of material on parallel plates of 25 mm diameter with an ARES rheometer by TA Instruments. Tests were performed at either 210° C. temperature at a constant angular frequency of 0.3 rad/s and a strain of 20% under air atmosphere. Nitrogen atmosphere was used in the convection oven during sample preparation and during the 5 minute delay built in to reach thermal equilibrium in the system. The complex viscosity was measured and reported for a time period of 1 hour. This method was presented at the European Polymers, Films, and Lamination and Extrusion Coating Conference in 2001 (P. Mariani et al. 2001)

Adhesion

Adhesion testing is conducted in accordance with ASTM F904. Prior to testing, samples are conditioned for a minimum of 40 hrs at 23° C. (±2° C.) and 50% (±10%) R.H.

For cast sheet samples: The sheets are scored, snapped, and pealed 1 inch to separate the polystyrene outer layer from the other components of the system. These sheets are then cut into 1 inch wide strips along the machine direction, i.e. such that each strip contains a sealed section. The snapped section is placed in the grips of the Instron and the sample is tested at 12 in/min. Peak load over 3 inches (from 1 inch to 4 inches) of delamination was reported.

Unless otherwise indicated, the disclosure of any ranges in the specification and claims are to be understood as including the range itself and also anything subsumed therein, as well as endpoints.

It will be apparent to those skilled in the art that modifications and variations can be made to the embodiments described herein without departing from the spirit and scope of the claimed subject matter. Thus it is intended that the specification cover the modifications and variations of the various embodiments described herein provided such modifications and variations come within the scope of the appended claims and their equivalents.

The invention claimed is:

1. A tie layer composition comprising
functionalized polyethylene, styrene block copolymer, base polyethylene, and antioxidant co-stabilizers,
wherein the antioxidant co-stabilizers comprise at least one oxygen scavenger comprising a phosphite, at least two peroxy free radical scavengers comprising sterically hindered phenolics, and at least one alkyl free radical scavenger comprising an acrylate, thereby demonstrating improved adhesion and viscosity control, and wherein the tie layer composition comprises from 3000 to 10,000 ppm of the antioxidant co-stabilizers including 1000 to 4300 ppm of the alkyl free radical scavenger.

2. The tie layer composition of claim 1 wherein the functionalized polyethylene is maleic anhydride grafted polyethylene.

3. The tie layer composition of claim 1 wherein the styrene block copolymer comprises styrene butadiene styrene.

4. The tie layer composition of claim 1 wherein the tie layer composition comprises 20 wt. % to 50 wt. % styrene block copolymer.

5. The tie layer composition of claim 1 wherein the tie layer composition comprises 5 wt. % to 25 wt. % of functionalized polyethylene.

6. The tie layer composition of claim 1 wherein the tie layer composition comprises 25 wt. % to 75 wt. % of polyethylene.

7. The tie layer composition of claim 1 wherein the styrene block copolymer of the tie layer composition comprises at least 35 wt. % of styrene monomer.

8. A multilayer film comprising at least five layers, wherein the at least 5 layers comprise:
at least one polyolefin outer layer;
at least one polystyrene outer layer;
at least one core layer disposed between the polyolefin outer layer and the polystyrene outer layer, the core layer comprising a polar polymer;
a first tie layer disposed between the polyolefin outer layer and the core layer; and
a second tie layer disposed between the polystyrene outer layer and the core layer,
wherein the first tie layer, the second tie layer, or both comprises a tie layer composition comprising
functionalized polyethylene, styrene block copolymer, base polyethylene, and antioxidant co-stabilizers,
wherein the antioxidant co-stabilizers comprise at least one oxygen scavenger comprising a phosphite, at least two peroxy free radical scavengers comprising sterically hindered phenolics, and at least one alkyl free radical scavenger comprising an acrylate, thereby demonstrating improved adhesion and viscosity control, and
wherein the tie layer composition comprises from 3000 to 10,000 ppm of the antioxidant co-stabilizers including 1000 to 4300 ppm of the alkyl free radical scavenger.

9. The multilayer film of claim 8 wherein the first tie layer and the second tie layer have a thickness of 2 to 20% of the overall thickness of the multilayer film.

10. The multilayer film of claim 8 wherein the first tie layer and the second tie layer both comprises the tie layer composition.

11. The multilayer film of claim 8 wherein the polyolefin outer layer comprises polyethylene, or a blend of polyethylene and one or more additional polyolefins.

12. The multilayer film of claim 8 wherein the polar polymer of the core layer comprises ethylene vinyl alcohol copolymer.

13. The multilayer film of claim 8 wherein the polystyrene outer layer comprises polystyrene, high impact polystyrene, blends of multiple polystyrene resins, or blends of polystyrene and polyolefin resins.

14. The tie layer composition of claim 1 wherein the tie layer composition comprises 30 wt % to 40 wt % styrene block copolymer.

15. The tie layer composition of claim 1 wherein the tie layer composition comprises 10 wt. % to 20 wt. % functionalized polyethylene.

16. The tie layer composition of claim 1 wherein the tie layer composition comprises 40 wt. % to 60 wt. % of polyethylene.

* * * * *